INVENTORS
L. R. WOSIKA
G. B. HODGSON
P. A. PITT

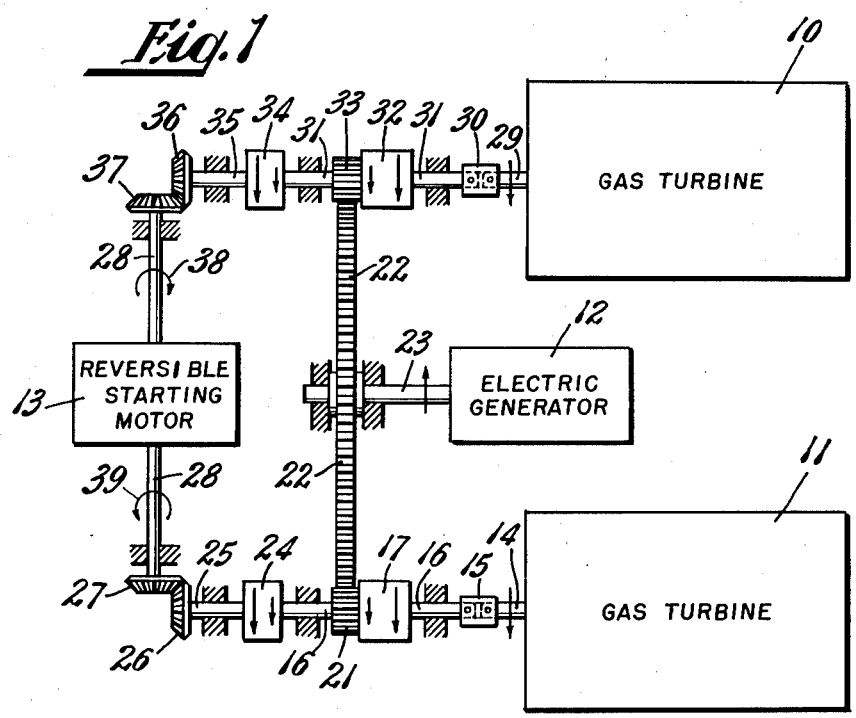
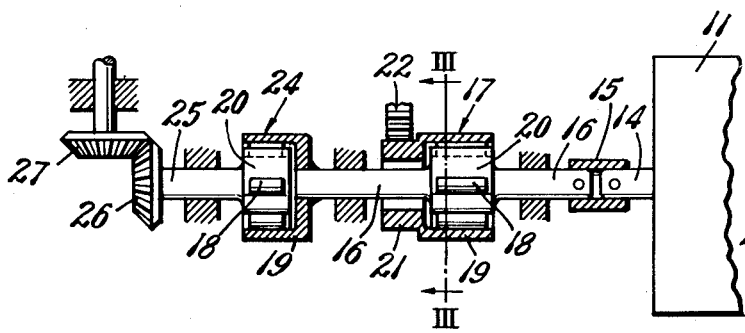
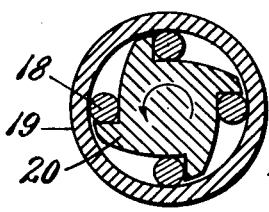

BY *E. L. Woodbury*

ATTORNEY

United States Patent Office 2,723,531
Patented Nov. 15, 1955

2,723,531

AUXILIARY POWER SUPPLY DEVICE FOR AIRCRAFT AND CONSTANT SPEED DRIVE MECHANISM THEREFOR

Leon R. Wosika, Grant B. Hodgson, and Paul A. Pitt, San Diego, Calif., assignors to Solar Aircraft Company, San Diego, Calif., a corporation of California Application July 21, 1947, Serial No. 762,444

2 Claims. (Cl. 60—102)

This invention relates to auxiliary power plants for aircraft, such as for supplying electrical energy and the like, as distinct from power plants for supplying motive force to the craft.

The simplicity, compactness, and light weight of the gas turbine inherently adapts it for this type of service. On the other hand, gas turbines as previously used are very poorly adapted for this type of service, because they are inherently inefficient when operated at less than their maximum power, and an aircraft auxiliary power plant must so operate much of the time. This is particularly true of military aircraft. On such craft, the peak electrical load may be required (even though for only a short interval) at the ceiling altitude of the craft. A gas turbine large enough to supply this peak load at ceiling altitude of say 40,000 feet would be operating at only 30% to 50% of capacity under normal flying conditions at say 15,000 feet altitude. Because of the greater density of the air at lower elevations, a turbine unit has over twice the power capacity at 15,000 feet that it has at 40,000 feet. Therefore, 30% of the rated load is less than 15% of the actual capacity of the turbine at 15,000 feet. At sea level, the turbine must operate at even a smaller fraction of its actual capacity. Unfortunately, the thermal efficiency of gas turbines falls off very rapidly as the load is reduced, much more rapidly than in the case of conventional reciprocating gas engines, and the specific fuel consumption rises proportionately. The same turbine unit will have a specific fuel consumption approximately four times as great when operating at half rated load at sea level as when operating at full rated load at 40,000 feet. This high specific fuel consumption under average flying conditions has outweighed the advantages of simplicity, compactness, and light weight, because the weight of the extra fuel that had to be carried usually far exceeded the saving in engine weight over that of a reciprocating engine.

Various expedients have been tried to raise the efficiency of gas turbines when operating at partial loads and/or low altitudes, by changes in the design of the turbines, such as using variable pitch blades in the compressor. However, to the best of our knowledge, no such expedients have materially reduced the specific fuel consumption at low loads. The fact that the driving shaft speed of the alternating current generator or other auxiliary power supply device must not vary more than a fraction of a cycle has heretofore frustrated the practical solution of this long recognized problem.

An object of the invention is to provide a simple, lightweight gas turbine power plant capable of operating over a wide altitude range and/or a wide load range, while still having a relatively low specific fuel consumption.

Another object is to provide for an aircraft, a gas turbine auxiliary power plant which is relatively reliable and capable of delivering at least part of its rated power output even in the event of partial failure of the plant.

Another object is to provide a multi-unit gas turbine power plant having a single starting motor and a particularly simple and effective method of selectively connecting the starting motor with either of the gas turbines.

By using the present invention, the efficiency is greatly improved by employing in a power plant a plurality of small turbine units all adapted to be coupled to a single generator, and working only as many units as are necessary to satisfy the power demand at any time. If two turbine units are employed, the specific fuel consumption can be reduced by almost one half, where the power plant must operate over a wide range of altitude and a wide load range.

The explanation for this resides in part in the fact that the density of the atmosphere at 40,000 feet is only about one fourth that at sea level, and so when operating at sea level, although the volume rate of flow of air through the unit is practically the same as at 40,000 feet altitude, the weight or mass flow is some four times as great. As a result, the maximum available output of the turbine at sea level is nearly three times that at 40,000 feet altitude, and when operating at the same rated power output as it is capable of at 40,000 feet altitude, the unit operates at only a fraction of its maximum capacity and maximum efficiency. By using several turbine units instead of one, and operating only one of the turbines at low elevations, the necessary output can be obtained with a much higher efficiency. The following table shows the relative fuel consumptions at different loads and different altitudes of two gas turbines, one of size to yield a full rated power at 40,000 feet, and the other of half that size:

TABLE A

*Fuel consumption index per horsepower*

| Percent of Full Load | Altitude in Feet | Specific Fuel Consumption of Half Size Turbine | Specific Fuel Consumption of Full Size Turbine |
|---|---|---|---|
| 50 | 40,000 | 0.72 | 1.0 |
| 50 | 15,000 | 1.5 | 2.6 |
| 50 | 0 | 2.1 | 3.7 |
| 100 | 15,000 | 0.9 | 1.3 |
| 100 | 0 | 1.3 | 2.1 |

It is obvious from inspection of this Table A that wherever a half size turbine is capable of delivering the required power, it does so at a much better efficiency than the full sized unit.

In the drawing:

Fig. 1 is a schematic view of an electric power plant in accordance with the invention employing two gas turbines;

Fig. 2 is a detail view partly in section of the shaft and related mechanism of the lower turbine of Fig. 1;

Fig. 3 is a detail section taken in the plane III—III of Fig. 2 showing a type of overriding or overrunning clutch that can be employed.

Figure 4:
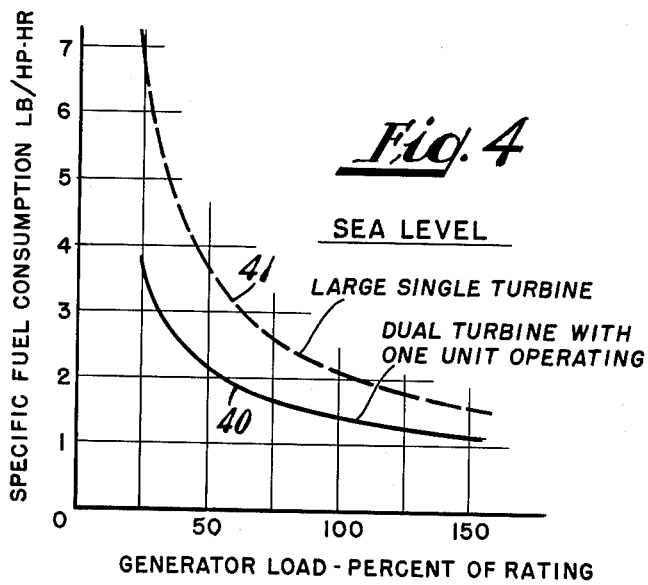
Figs. 4, 5 and 6 are graphs illustrating the advantages of the invention.

Referring to Fig. 1, the main elements of the system shown therein are two gas turbines 10 and 11, respectively, which are adapted to drive a generator 12, and a starting motor 13 together with a mechanism for enabling it to start either of the turbines 10 and 11.

Each of the turbines 10 and 11 drives the generator 12 through an overrunning clutch, so that either turbine can be stopped without affecting the driving relation between the other turbine and the generator. Thus the turbine 11 has a drive shaft 14 which is rotated in the direction indicated by the arrow thereon. This shaft 14 is coupled by a coupling 15 to a shaft 16, which is coupled by an overrunning clutch 17 to a spur pinion 21 which meshes with a large spur gear 22 on the shaft 23 of the generator 12. Because of the fact that the generator is driven through the spur gears 21 and 22 its shaft 23 rotates in the opposite direction from the shaft 14 as indicated by the arrow.

Referring to Figs. 2 and 3, the overrunning clutch 17 includes an inner element 20 secured to the shaft 16, a plurality of rollers 18, and an outer sleeve 19 which is secured to the spur pinion 21. When the inner member 20 rotates in counterclockwise direction (with reference to Fig. 3) the rollers 18 are wedged between the member 20 and the sleeve 19 to cause the member 20 to drive the sleeve. On the other hand when the sleeve 19 is rotated in counterclockwise direction faster than the inner member 20, the rollers 18 are carried out of wedging relation, permitting the sleeve 19 to rotate with respect to the member 20. Clutches of the type described are well known and need not be shown in further detail.

Referring again to Fig. 1, it is apparent, therefore, that the turbine 11 is capable of driving the generator 12 but the transmission is not reversible and the turbine cannot be rotated by the generator.

The turbine 10 is similarly connected or coupled to the generator 12. Thus the shaft 29 of this turbine is connected through a coupling 30 to a shaft 31 which in turn is coupled by an overrunning clutch 32 to a spur pinion 33, which meshes with the spur gear 22. When the turbine shaft 29 rotates in the direction indicated by the arrow thereon, its motion is transmitted through the overrunning clutch 32 to the spur pinion 33. On the other hand, motion of the spur pinion 33 in the same direction will not drive the shaft 29.

Each of the overrunning clutches 17 and 32 has two arrows drawn thereon adjacent opposite ends and both facing in the same direction, but one being longer than the other. These arrows represent the manner in which the overrunning clutches function. Thus the shaft adjacent the long arrow is capable of driving the shaft adjacent the short arrow in the direction of the arrows, but the shaft adjacent the short arrow is incapable of driving the shaft adjacent the long arrow in that direction. The use of these arrows facilitates a quick understanding of the operation of the system.

The reversible starting motor 13 is so coupled to the two turbines 10 and 11, through overrunning clutches and beveled gears, that it starts one turbine when running in one direction and starts the other turbine when running in the other direction. Thus the motor 13 has a shaft 28 which extends from both ends thereof and mounts a bevel gear 37 on one end (the upper end) and a bevel gear 27 on the other (lower end). The bevel gear 37 meshes with a bevel gear 36 on a shaft 35 which is coupled by an overrunning clutch 34 to the shaft 31, which rotates at all times with the turbine 10. Likewise the bevel gear 27 meshes with a bevel gear 26 on a shaft 25 which is coupled by an overrunning clutch 24 to the shaft 16 which is at all times in driving and driven relation with the shaft 14 of the turbine 11.

The overrunning clutches 34 and 24 may be of the same construction as the clutch 17 illustrated in Figs. 2 and 3, and they are so arranged as to operate in the manner indicated by the arrows thereon. Thus the shaft 35 can drive the shaft 31 through the overrunning clutch 34 in the direction indicated by the arrows thereon, but the shaft 31 cannot drive the shaft 35 in the same direction. Similarly, the shaft 25 can drive the shaft 16 through the clutch 24 in the direction indicated by the arrows on the clutch, but the shaft 16 cannot drive the shaft 25 in the same direction.

The result is that when the shaft 28 of the starting motor is rotated in the direction indicated by the arrow 38, the shaft 35 is rotated in the direction indicated by the arrows on the clutch 34, and it therefore drives the shaft 31, which in turn drives the shaft 29 of the turbine 10 in proper direction to start it. During rotation of the shaft 28 in the direction indicated by the arrow 38, the shaft 25 is rotated through the bevel gears 27 and 26 in direction opposite to the arrows on the clutch 24. This clutch therefore transmits no motion from the shaft 25 to the shaft 16.

On the other hand, when the starting motor 13 is run in the direction indicated by the arrow 39, the shaft 28 drives the shaft 25 in the direction indicated by the arrows on the clutch 24 so that the latter transmits the motion through the shaft 16 to the shaft 14 of the turbine 11, starting the latter. At this time the bevel gears 37 and 36 apply the rotation of the shaft 28 to rotate the shaft 35 in the direction opposite that indicated by the arrows on the clutch 34, under which conditions this clutch does not transmit the motion to the shaft 31.

Figure 5:
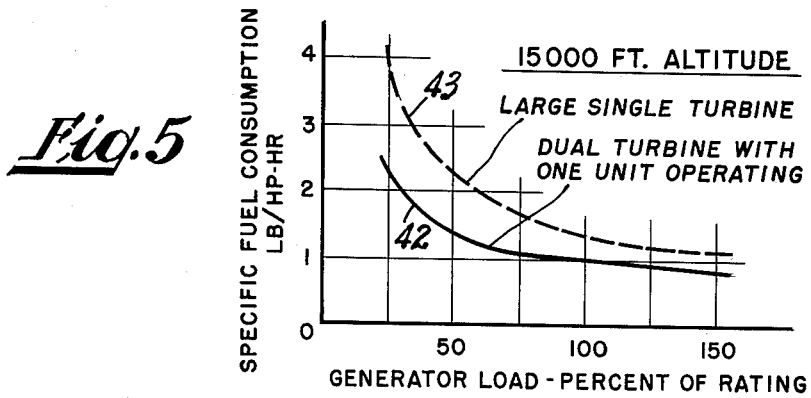
Figure 6:
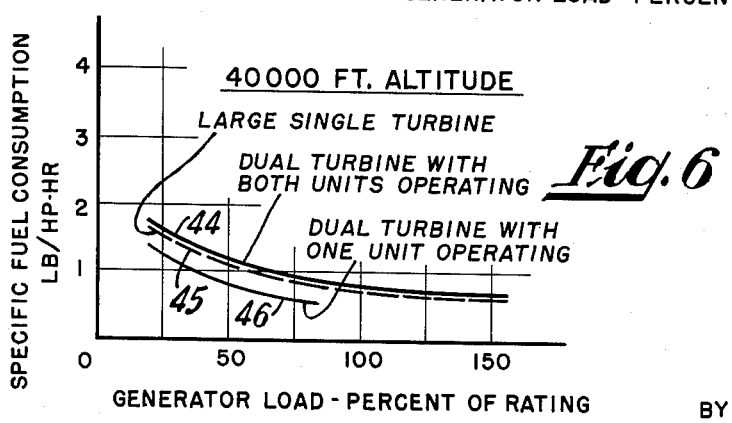

The operating advantages of a dual power plant having equal size turbines is clearly brought out by the graphs of Figs. 4, 5, and 6. In Fig. 4, curve 40 shows the specific fuel consumption, at sea level, of a small turbine such as one of the units 10 or 11, and curve 41 shows the specific fuel consumption, at sea level, of a turbine twice as large. The vertical distance between the two curves represents the fuel saving effected by using the small turbine instead of the large one. It will be remembered that at sea level the maximum output of the small unit exceeds the rated output at 40,000 feet of a unit twice as large.

In Fig. 5, curves 42 and 43 correspond respectively to curves 40 and 41 of Fig. 4, but show the specific fuel consumptions of the small and large units at 15,000 feet, whereas curves 40 and 41 show performance at sea level.

In Fig. 6, curves 44, 45, and 46, respectively, show the specific fuel consumptions at 40,000 feet of: (1) a dual turbine with both units operating; (2) a single, large turbine; and (3) a dual turbine with only one unit operating.

Instead of the turbines being equal, one turbine may have half the capacity of the other. This enables one or the other of the turbines to operate nearer its maximum load when the total load required is less than the amount necessary to operate both of the turbines. Thus when only one third or less of the full power is required, it can be supplied by the smaller turbine. When from one third to two thirds of the full power is required, it can be supplied by operation of the large turbine alone. Only when the power required exceeds two thirds of the maximum rated power is it necessary to operate both of the turbines simultaneously.

When the smaller turbine has only one third the power of the two turbines in combination, it is capable of delivering the same rated output at altitudes up to 15,000 feet that both turbines together are capable of yielding at an altitude of 40,000 feet. Similarly, the larger turbine, having only two thirds of the power of the two turbines together, is capable of supplying the full rated load up to altitudes of 24,000 feet. Therefore, in practice, the smaller turbine can be used alone to supply all power demands of a plane during flight at altitudes up to 15,000 feet. This turbine would then be cut out and the larger turbine would be started and used alone to supply all power requirements from elevations of 15,000 feet to elevations of 24,000 feet. Above the latter height, both turbines would be operated simultaneously to provide full power output.

From the foregoing description it will be appreciated that we have provided an auxiliary power plant for aircraft which constitutes an entirely practical solution of the problem of comparatively low weight and fuel consumption, with a substantially constant driving speed of the electric current generator or other power supply device under different atmospheric pressure conditions at varying altitudes.

Although the two turbines 10 and 11 and the necessary mechanism for coupling them to the generator 12 in the manner described weigh more than would a simple power plant consisting only of one turbine directly coupled to a generator, the saving in fuel required more than compensates for this additional weight on flights of reasonable duration. This will be readily appreciated when it is understood that fuel consumption may be reduced by substantially one half by the use of the two units as described, where the power plant must operate over a wide altitude range and/or wide load range.

Another advantage of the assembly is that it is more reliable than a single turbine unit. Thus should either one of the turbines 10 or 11 fail, the other would continue to operate and supply power up to its capacity.

If the entire capacity of the plant is not needed for a particular flight, one of the turbines 10 or 11 may be removed enitrely, thereby saving considerable weight. This feature is particularly important for auxiliary power plants on combat military aircraft having large electrical demands. It is logical to assume that during a major part of operation of such craft, only a fraction of the total electrical power capacity would be required. Thus in many instances, such airplanes are used in transport service, etcetera, where the operation of turrets, guns, and radar equipment is not necessary. Consequently, only a fraction of the maximum electrical capacity would be required. In such instances the removal of one turbine unit 10 or 11 from the set would effect an important saving in weight.

Another advantage is that the use of a dual turbine plant for large planes would enable standardization on a relatively few sizes of gas turbines for use on power plants on planes of different sizes. Thus a small turbine could be used directly coupled to a generator for certain power requirements on relatively small planes. A larger turbine would be similarly adapted for use on medium sized planes, and the combination of the two as described herein would satisfy the requirements of the largest planes.

Although for the purpose of explaining the invention, a particular embodiment thereof, with a few variations, has been described in detail, other departures from the construction shown will appear to those skilled in the art and the invention is therefore not to be limited to the exact details described, nor to the specific altitudes mentioned.

We claim:

1. A low fuel consumption auxiliary power plant system for aircraft auxiliary mechanism having substantially uniform power requirements at all altitudes unaffected by variations in gravitational and altitude forces comprising a plurality of internal combustion engines of less predetermined rated capacity than that which is adequate to satisfy the auxiliary mechanism requirements at a predetermined ceiling altitude range but of such rated capacities as to assure a combined rated capacity when operating together to deliver the total maximum power output for satisfying the peak load auxiliary mechanism requirements throughout the predetermined ceiling altitude range and at least one of said engines being operable at its rated capacity throughout a certain lower altitude range to alone provide the required power for supplying the peak load auxiliary mechanism requirements at said lower altitudes; separate overrunning drive couplings respectively associated with each of said plurality of engines adapting said engines for respective unidirectional power transmission to said auxiliary mechanism; a reversible starting motor having drive shafts extending from each end; and individual shaft means for each of said drive shafts, including an overrunning clutch, for connecting said drive shafts respectively for unidirectional power transmission to one of said engines adapting said starting motor for selectively imparting starting forces to said respective engines in response to selected directional rotation of said reversible motor.

2. In combination with an auxiliary power supply device for an aircraft having a substantially uniform power output requirement at all altitudes: an auxiliary power mechanism for driving said power supply device to assure maintenance of said uniform power output under varying altitude and pressure conditions, said mechanism comprising a plurality of internal combustion engines independently drivingly connected to transmit power unidirectionally to said auxiliary power supply device and each having a predetermined rated capacity for supplying the power to satisfy the requirements of said auxiliary power supply device at predetermined low altitudes only, and control mechanism comprising a reversible starting motor and one-way overrunning clutch devices coupling said starting motor to transmit power uni-directionally to the respective internal combustion engines for selectively starting said engines and initiating the transmission of power from said respective engines to said auxiliary power supply device whereby one of said engines may be selectively employed within its rated capacity or both of said engines may be selectively employed within their respective rated capacities to satisfy the requirements of said auxiliary supply device at altitudes from sea level to maximum altitude.

References Cited in the file of this patent

UNITED STATES PATENTS

| | | |
|---|---|---|
| 1,089,029 | Zimmermann | Mar. 3, 1914 |
| 1,466,394 | Fornaca | Aug. 28, 1923 |
| 2,261,670 | Bailey | Nov. 4, 1941 |
| 2,396,804 | Ormsby | Mar. 19, 1946 |
| 2,414,766 | Platt | Jan. 21, 1947 |
| 2,419,929 | Wilcox | Apr. 29, 1947 |
| 2,462,824 | Zimmerman et al. | Feb. 22, 1949 |